United States Patent [19]

Lang

[11] Patent Number: 4,459,974

[45] Date of Patent: Jul. 17, 1984

[54] SOLAR BOTTLE

[76] Inventor: Mark S. Lang, 771 D Ave., Apt. A, Coronado, Calif. 92118

[21] Appl. No.: 463,509

[22] Filed: Feb. 3, 1983

Related U.S. Application Data

[63] Continuation of Ser. No. 208,052, Nov. 17, 1980, abandoned.

[51] Int. Cl.³ .............................................. F24J 3/02
[52] U.S. Cl. .................................... 126/440; 126/438; 126/451; 126/450; 206/543
[58] Field of Search ............... 126/450, 438, 439, 440, 126/451; 206/543; 215/13 R; 220/403, 420, 454

[56] References Cited

U.S. PATENT DOCUMENTS

| | | | |
|---|---|---|---|
| 1,700,675 | 1/1929 | Goddard | 126/451 |
| 3,125,091 | 3/1964 | Sleeper, Jr. | 126/440 X |
| 3,970,070 | 7/1976 | Meyer et al. | 126/440 X |
| 4,022,186 | 5/1977 | Northrup, Jr. | 126/440 |
| 4,116,223 | 9/1978 | Vasilantone | 126/440 X |
| 4,257,401 | 3/1981 | Daniels | 126/440 X |

Primary Examiner—Larry Jones
Attorney, Agent, or Firm—Charles W. Fallow; Martin P. Hoffman; Mitchell B. Wasson

[57] ABSTRACT

A solar collector comprising, a bottle like structure with a front serrated lens surface, rear convex reflector, central heating chamber and plurality of tubular members each holding adjustable reflectors, for heating food located within the chamber is disclosed.

3 Claims, 12 Drawing Figures

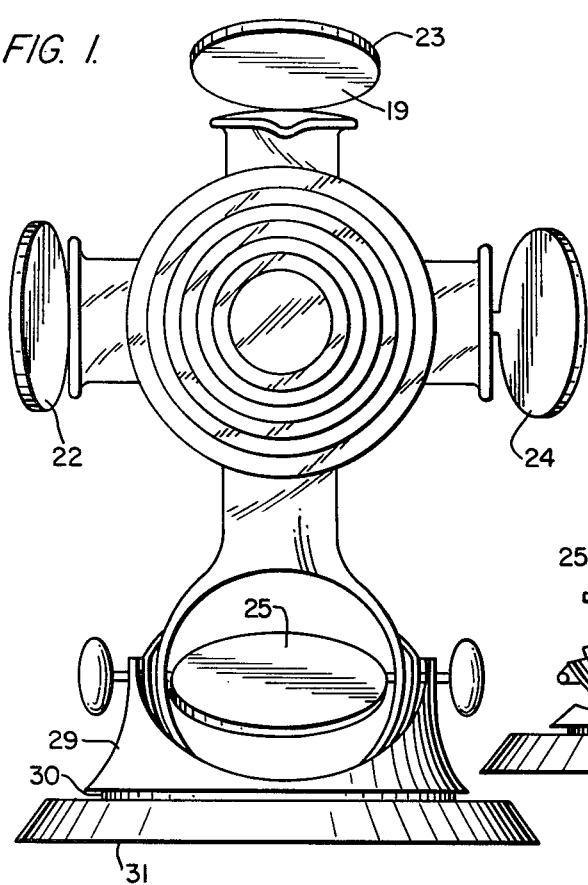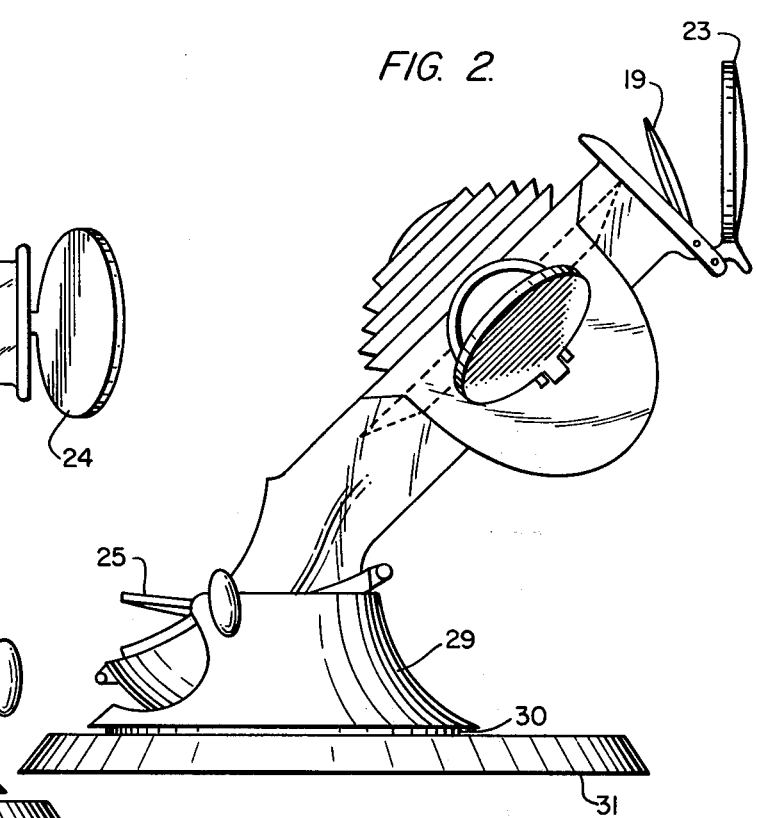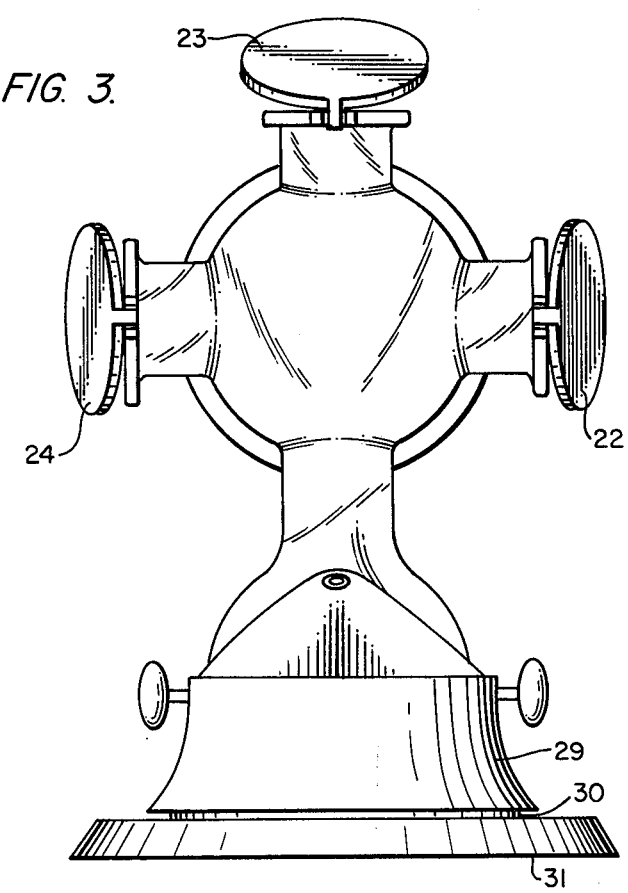

SOLAR BOTTLE

This is a continuation of application Ser. No. 208,052, filed Nov. 17, 1980, now abandoned.

BACKGROUND OF THE INVENTION

This invention relates to solar energy collectors in general, and in particular to a collector (or "bottle" hereafter) for collecting sunlight and concentrating the same upon a target within the bottle. The target may be, for example, soup, tea, coffee or food; other potential uses will readily occur to one of skill in the art.

The prior art in this field is extensive and contains numerous optical arrangements for concentrating sunlight falling upon a given area onto a substantially smaller area so as to heat a target therein. There are of course many arrangements employing convex reflectors, having a parabolic profile so as to reflect parallel rays of incoming sunlight upon a point focus. In other collectors a convergent lens is employed to focus sunlight upon a target. One known type of convergent lens is the Fresnel lens, which has a serrated profile and is capable of achieving fairly short focal lengths while retaining a generally planar configuration.

Prior devices are subject to certain drawbacks, one of which is that their focusing devices must be accurately pointed at the sun to work properly. Furthermore, many prior art devices are capable of heating only one side of a target which would make them undesirable for many cooking applications. In general, prior art solar collectors lack versatility in that they cannot be adjusted to provide different degrees of heating upon different sides of a solid target.

The present invention overcomes the above deficiencies by providing a solar bottle with both a convergent lens having a serrated profile, a target behind the lens and a convex reflective surface behind the target for reflecting stray light onto the rear side of the target. Versatility is provided by the provision of a number of auxiliary reflecting surfaces pivotally mounted on tubular members extending generally radially from the bottle for directing sunlight at the sides of the target.

One object of the invention is to develop a simple yet effective solar collector for the purpose of cooking food or the like. Another object is to render a solar collector less sensitive to changes in the sun position. A further object is to provide a versatile solar collector that enables its user to vary the amount of sunlight falling upon the sides of the target at will.

The invention satisfies these and other objects of the invention. A bottle embodying the invention is shown in the accompanying drawings and is discussed in the description of the preferred embodiment below.

DESCRIPTION OF THE DRAWINGS

Referring to the drawings:

FIG. 1 is a front view of a solar bottle embodying the invention;

FIG. 2 is a side elevational view thereof;

FIG. 3 is a rear elevational view thereof;

DESCRIPTION OF THE PREFERRED EMBODIMENT

Figure 4:
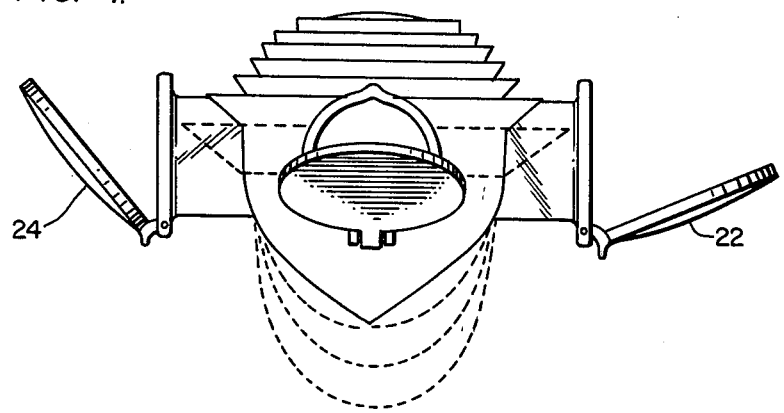
FIG. 4 is a top plan view thereof.
Figure 5A:
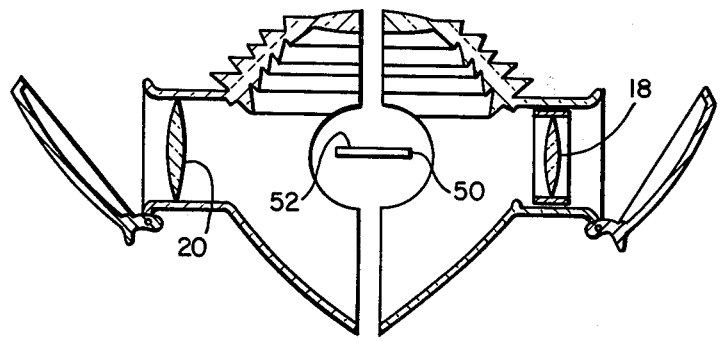
FIG. 5a is a horizontal cross-section of the bottle shown in FIG. 1.
Figure 5B:
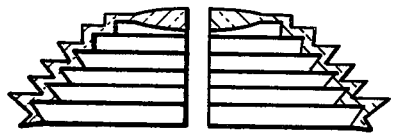
FIGS. 5b-5f show various forms of the lens profile.
Figure 5D:
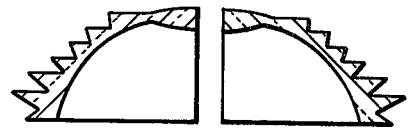
Figure 5C:
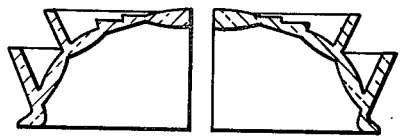
Figure 5E:
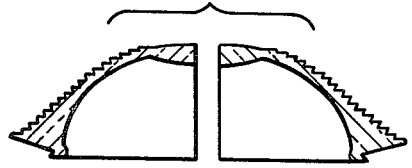
Figure 5F:
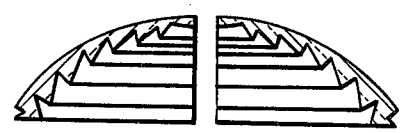
Figure 6:
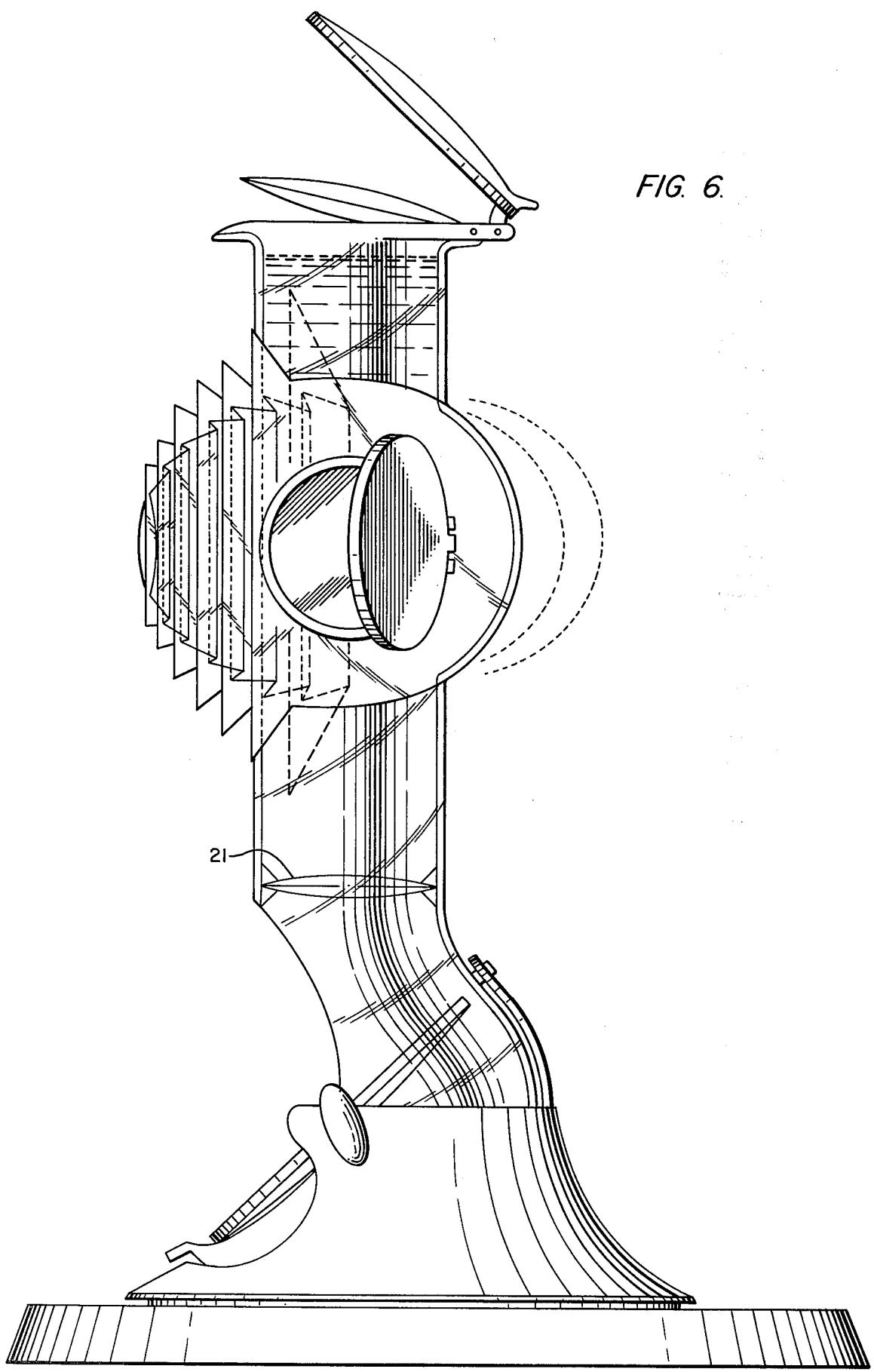
FIG. 6 is a vertical cross-section of the bottle shown in FIG. 1.
Figure 7:
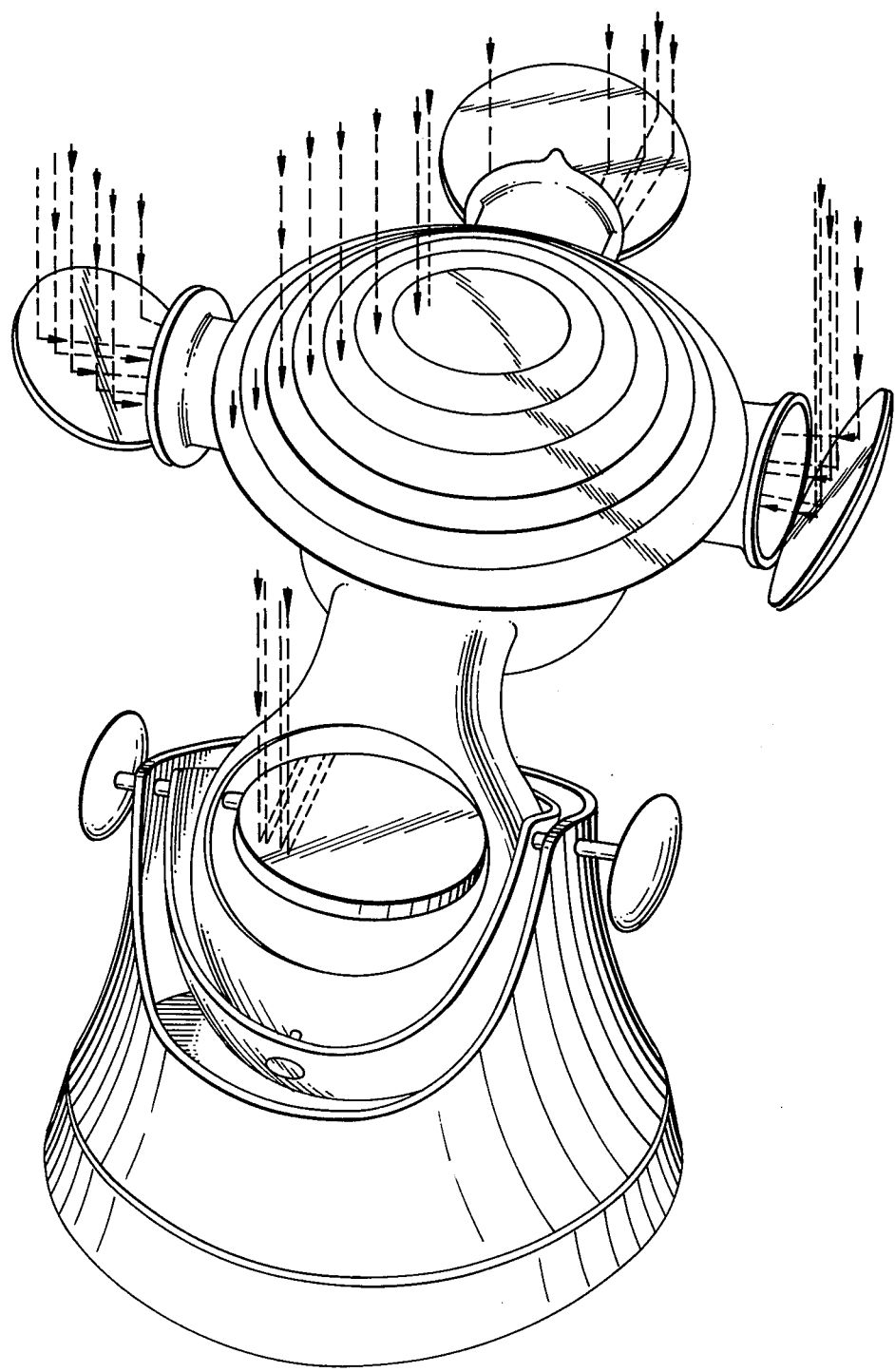
FIG. 7 is a three-quarter front perspective view of the structure shown in FIG. 1.

The invention is embodied in a solar bottle shown in FIGS. 1-7 including a central housing having an optically transmissive convergent lens at one side thereof which for the sake of convenience will be referred to as the "front" of the device hereafter. In use, of course, the front side of the device is directed generally toward the sun. In its preferred form, the convergent lens has a serrated profile (as illustrated in FIGS. 2 and 5) which is discussed in greater detail below.

The rear of the chamber defines a generally convex surface capable of reflecting stray sunlight back toward the center of the chamber. The generally parabolic profile of the preferred reflective surface is best seen in FIG. 2. The interior of the rear portion of the chamber is covered with a suitable reflective coating.

As FIG. 5 shows, a target 50 is positioned at the focal point 32 of both the convergent lens and the reflective rear surface of the chamber. In this way, the target is heated on both sides, and any light that the lens fails to concentrate on the target, particularly when the device is not pointed directly at the sun, is apt to be reflected by the rear surface onto the rear side of the target.

The chamber has a plurality (four are shown) of generally tubular members that are formed integrally with the chamber and extend radially therefrom. The uppermost of these members may be provided with a pouring lip as illustrated in FIG. 1 in the event that the bottle is to be filled with a liquid.

A reflective mirror 22, 23, 24 or 25 is pivotally mounted at the distal end of each of the tubular extensions. The pivotal mounting enables one to adjust the angularity of the side mirrors in order to direct sunlight at the sides of The target 50. Convergent lenses 18, 19, 20 and 21 may be placed between the side mirrors and the target to improve focus.

The entire chamber is pivotally supported upon a pedestal 29 that is rotatably supported by a bearing 30 upon a fixed base 31, to facilitate tracking the sun.

The exact nature of the main convergent lens is best shown in FIG. 5 and section b. As shown, it can be seen that the lens is dome shaped that is outwardly convex and includes a small smooth converging central portion surrounded by concentric steps. The domed configuration of the lens when compared to a generally planar Fresnel lens provides increased volumetric capacity within the chamber.

The unusual shape of the reflective surface formed by the rear wall of the housing should be noted. While the profile of the reflector in a vertical plane (e.g., FIG. 2) is parabolic, the vertical profile (FIG. 4) is formed by two parabolic segments that intersect at a point. The resultant arched or ogive profile is more tolerant of solar misalignment than a purely parabolic reflector.

In use, the entire chamber may be filled with liquid in which case the lenses 18, 19, 20 and 21 act as sealing members or any solid target may be placed at or near the focus 32. With the convergent lens pointed substantially at the sun, the side mirrors 22, 23, 24 and 25 are adjusted as desired to focus additional energy on the sides of the target. The convergent lens and reflective back surface focus sunlight onto the target to provide rapid heating thereof. Owing to the arched or ogive profile of the reflective surface as shown in FIG. 4, the device continues to focus sunlight upon the target even as the sun moves from its original position directly in front of the convergent lens.

Virtually the entire unit may be made out of inexpensive molded plastic material so that it can be manufactured in quantity at very little expense. The construction is simple, yet surprisingly effective and is capable of many equally useful applications.

The structure shown in the drawings and described above is but one embodiment of the subject invention and should not be taken as in any way limiting the scope of the following claims.

What is claimed is:

1. A solar collector comprising
   a convergent lens having a concentrically serrated surface and forming the front boundary of a heating chamber,
   a convex reflector defining the rear boundary of said heating chamber,
   said convergent lens and said reflective surface being arranged so as to focus incident light upon a common target within the chamber,
   a housing formed integrally with said reflector,
   a plurality of tubular members extending radially from said housing, and
   a plurality of side mirrors, each of said mirrors being pivotally mounted upon the distal end of a respective one of said tubular members whereby each mirror can be adjusted to regulate the amount of light reflected through its respective tubular member into said heating chamber.

2. A solar collector comprising
   a convergent lens having a concentrically serrated surface and forming the front boundary of a heating chamber,
   a convex reflector defining the rear boundary of said heating chamber,
   said convergent lens and said reflective surface being arranged so as to focus incident light upon a common target within the chamber,
   a plurality of tubular members extending radially from said chamber, and
   a like plurality of side mirrors,
   one of said mirrors being mounted at the end of each of said tubular members for reflecting additional light into said chamber,
   said side mirrors being pivotally mounted upon their respective tubular members so that the amount of light reflected into said chamber by each of said side mirrors can be regulated.

3. A solar collector comprising
   a housing defining a treating chamber,
   a convergent lens forming the front boundary of the chamber,
   said lens having a first surface nearer said heating chamber and a second surface further from said heating chamber,
   both of said surfaces having concentric serrations,
   a convex reflector defining the rear boundary of said heating chamber,
   said lens and said reflector being arranged so as to focus incident light upon a common target within the chamber,
   a plurality of tubular members extending radially from said housing, and
   a plurality of side mirrors, each of which is pivotally mounted upon the distal end of a respective one of said tubular members whereby each mirror can be adjusted to regulate the amount of light reflected through its respective tubular member into said heating chamber.

* * * * *